Patented Oct. 3, 1944

2,359,667

UNITED STATES PATENT OFFICE 2,359,667

METHOD OF TREATING AQUEOUS DISPERSIONS OF RUBBER

Stewart R. Ogilby, Eltingville, Staten Island, N. Y., assignor to United States Rubber Company, New York, N. Y., a corporation of New Jersey No Drawing. Application March 29, 1941, Serial No. 385,853

17 Claims. (Cl. 260—821)

This invention relates to methods of treating aqueous dispersions of rubber, and more particularly to the purification and concentration of aqueous dispersions of natural and of synthetic rubbers, and to the production of redispersible rubber compositions and of purified rubber from such aqueous rubber dispersions.

This invention is based on the discovery that reaction products of stabilizers having the general formula R—SO$_3$—M, where R represents an organic radical containing at least one group having more than 8 carbon atoms, and M represents alkali metal, hydrogen, or ammonium radical, with alkylene polyamines having at least three amino groups, are insoluble in aqueous media below certain critical pH's and that when such reaction products are precipitated in a body of an aqueous dispersion of rubber, the dispersion is flocculated, provided that the pH is below that at which the dispersion is unstable or would coagulate in the presence of the amine without the stabilizer. These rubber flocs are readily separable from the serum, as by filtering, and may be dried, or redispersed in water by the addition of alkali, preferably to a pH of 9.5, or above. The pH below which reaction products of the stabilizer and amine will precipitate varies for different stabilizers and amines, but may readily be ascertained in a given case by reducing the pH of a solution containing the stabilizer and amine from a pH of 9.5 or above and observing at which pH precipitation occurs. The critical pH at which precipitation occurs may be as high as 9.3 for the precipitation of some reaction products, but is generally around 7 or below and will depend somewhat on the relative amounts of reactants.

The aqueous dispersion of rubber may be flocculated according to the present invention by precipitating the reaction product of the stabilizer and polyamine in the dispersion at a pH at which the dispersion would be unstable in the absence of the stabilizer and in the presence of the amine, and the flocs thus formed may be separated from the serum by decantation, filtering, centrifuging or the like. The polyamine raises the pH at which the dispersion becomes unstable and coagulable. The precipitate of the reaction product of the stabilizer and amine causes this coagulation to be in the form of a flocculation or aggregation. The rubber may be purified by diluting the dispersion with water before flocculation, or by washing the flocs with water after formation to remove water-soluble ingredients. The wet flocs, after separation from the serum as a wet mass, containing for example from 20% to 40% water, may be readily transported and stored, and may be redispersed with alkali at any time to produce a rubber dispersion of the desired concentration, which may be of higher rubber content than the original dispersion. The wet flocs may be redispersed by the addition of a dispersing agent which may be in the form of an excess of a stabilizer having the general formula R—SO$_3$—M, as above defined, or which may be a different type of dispersing agent, as for example, Emulphor-O, which is believed to be a reaction product of ethylene oxide and a higher alcohol. Drying of the flocs after washing of the rubber will produce a purified solid rubber. Thus, natural rubber latex may be flocculated on the plantations and the wet flocs shipped to rubber-consuming countries and stored until it is desired to utilize the rubber in dispersion form, whereupon the flocs may be redispersed in water by the addition of a suitable alkali. Again, the invention may be employed to concentrate aqueous dispersions of synthetic rubbers, such as "neoprene latex," which is an aqueous dispersion of polymerized chloro-2-butadiene 1,3, and "Perbunan latex" which is an aqueous dispersion of a co-polymer of butadiene and another polymerizable material such as acrylic nitrile or styrene, and which are commonly made by polymerizing the monomeric substances in an aqueous medium, oftentimes using as an emulsifying agent a stabilizer of the general formula R—SO$_3$—M as hereinbefore defined. Also, such dispersions of synthetic rubber may be flocculated according to the present invention and the rubber washed to remove water-soluble ingredients that are present in the dispersion, after which the flocs may be dried to produce a synthetic rubber containing a low amount of water-solubles. The present invention is also applicable to the preparation of purified crude rubber with low protein content from normal or concentrated latex. The latex may be flocculated at relatively high pH's because of the presence of the polyamine. The rubber may be washed at these high pH's so as to remove proteins that are water-soluble at such pH's but which are insoluble at the low pH's to which the pH of latex would have to be lowered to effect coagulation in the absence of the polyamine. Similarly, high grade rubber may be obtained according to the present invention from centrifuge skim, or from any heavier portion separated out in a centrifuging or creaming operation, even though the rubber content of the same is low and the protein content high, as compared to a normal latex.

Various stabilizers having the general formula

R—SO₃—M as defined above are illustrated as follows with reference to a classification for the radical R:

(1) Where R is an alkoxy group producing, as for example, various compounds from $$C_{10}H_{21}O—SO_3Na$$

to $C_{18}H_{37}O—SO_3Na$, known commercially under the trade names Gardinol, Duponal, Aquarex D, Orvus WA.

(2) Where R is an alkyl group producing, as for example in the formulae $C_{12}H_{25}—SO_3Na$ and $C_{16}H_{33}—SO_3Na$, lauryl sodium sulphonate and cetyl sodium sulphonate, respectively.

(3) Where R is a mixed ether of long and short chain aliphatic groups, as for example in the compound $C_{17}H_{33}—O—C_2H_4—SO_3Na$ believed to be the material known commercially as Nacconol LA.

(4) Where R is an alkyl ester of a long chain fatty acid, as for example in the compound

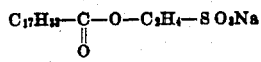

known commercially by the trade names Igepon A and Arctic Syntex A.

(5) Where R is a glycol ester of a long chain fatty acid, as for example in the formula

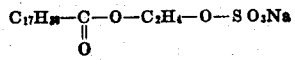

(6) Where R is an alkyl substituted amide of a fatty acid, as for example in the compounds

and

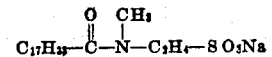

believed to be the commercial products Igepon T and Igepon TF, respectively.

(7) Where R is an alkyl substituted aromatic radical as in various commercial compounds having the formula

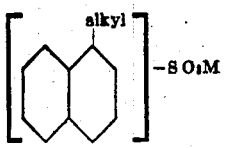

as for example, the sodium salts of alkyl naphthalene sulphonic acids, known under the trade names Nekal and Alkanol; a free alkyl naphthalene sulphonic acid, known commercially as Leonil SBS; the potassium salt of an alkyl naphthalene sulphonic acid known under the trade name Eunaphthol K.

(8) Where R is a hydroaromatic radical, as for example in the compound

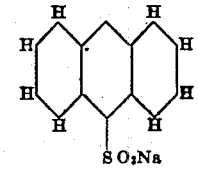

known under the trade name Octaton. Also where R is a hydroaromatic radical as in various commercial compounds having the formula

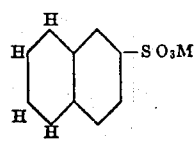

as for example, where M is sodium as in Alkanol S and Mayamin; where M is potassium as in Mayaminkalium; and where M is ammonium as in Mayammonium.

(9) Where R is an ester of a dibasic acid, such as

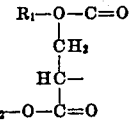

in which one of $R_1$ and $R_2$ may be an alkyl radical from $C_3H_7—$ to $C_8H_{17}—$ and the other hydrogen, or both $R_1$ and $R_2$ are such alkyl radicals, as for example in the commercial stabilizer known as Aerosol OT which has the formula

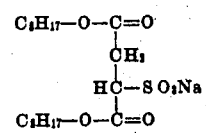

Various alkylene polyamines having at least three amino groups may be used to coagulate the stabilizers as defined above in the presence of aqueous dispersions of natural or synthetic rubber to produce flocculation of the dispersions, for example, diethylene triamine, triethylene tetramine, tetraethylene pentamine, other polyamines resulting from the reaction of alkylene dihalides with ammonia or primary amines, or mixtures of polymerized polyamines, such as the aldehyde amine reaction product sold under the trade name "Trimene Base." By the term "polyamine" is meant an amine having more than one amino group titratable with strong acid. The amino groups may be primary, secondary, or tertiary amino groups. The pH may be adjusted to cause precipitation of the reaction product of the stabilizer and polyamine and flocculation of the dispersion, by means of any acid material, such as acetic, sulphuric, or hydrochloric acid.

The precipitated flocs may be redissolved by the addition of a suitable alkali which will raise the pH of the wet flocs to above the critical pH at which the stabilizer and amine precipitate in aqueous medium and which will not itself precipitate the stabilizer or destabilize the dispersion. Some of the stabilizers having the general formula as defined above, notably the lauryl sulphate half esters, form relatively insoluble potassium salts, consequently with these stabilizers potassium hydroxide should not be the alkali selected for redispersing the rubber. It is preferred to raise the pH above 9.5, as with an alkali such as ammonia, dimethylamine, sodium hydroxide, potassium hydroxide, trisodium phosphate, sodium carbonate, to assure easy dissolution of the reaction product of the stabilizer and amine and redispersion of the rubber. The rubber dispersion resulting from the addition of the alkali to the wet flocs produced from a natural latex is not a suspension of precipitated rubber aggregates but is a true dispersion of colloidal rubber particles practically indistinguishable physically from the natural latex from which it was prepared. The individual particles are essentially of the same size as in the original latex and show no tendency to come together to form aggregates of larger size. When viewed under a microscope the individual particles exhibit a true Brownian movement. The viscosity of the suspension of redispersed flocs is of the same order as natural latex.

In carrying out the present invention, there is mixed with an aqueous dispersion of a rubber a stabilizer having the general formula R—SO₃—M as hereinbefore defined, and an alkylene polyamine having at least three amino groups, at a pH at which the reaction product of the stabilizer and amine is insoluble and the dispersion is unstable, thereby causing precipitation of the reaction product and flocculation of the rubber in the dispersion to a readily filterable state. As low as 1% of some stabilizers, based on the solids content of the rubber dispersion, for example, of lauryl sodium sulphonate, has been successfully utilized to produce the desired type of flocculation of the rubber particles in a natural latex and form flocs which are readily separable from the serum. In other cases, two or more percent of stabilizer, based on the solids content of the rubber dispersion, has been used to give the desired type of flocculation, and higher amounts up to 5% and to 10% of the stabilizer have been used without deleterious result. If too small an amount of stabilizer is added, the rubber dispersion will coagulate in a difficultly filterable condition. Maintaining the solids content of the dispersion low, preferably below 30%, permits the use of smaller amounts of stabilizer to produce the desired type of flocculation of the rubber particles than in the case of dispersions of higher concentration. The amount of amine may be equivalent to the stabilizer, or greater or less, as desired, so long as there is sufficient reaction product precipitated to produce a flocculated dispersion of readily filterable flocs and there is not too much unreacted stabilizer to prevent such flocculation of the dispersion. Equivalent weights of the stabilizer and polyamine reactants may readily be determined, as follows: A given amount of the stabilizer is dissolved in water and sufficient acid added to give a pH of about 6 or below, at which pH the reaction product of the stabilizer and amine is certain to be insoluble. A standard solution of the desired polyamine is prepared containing a known amount of polyamine plus sufficient acid to give a pH of 6 or below. Definite small increments of polyamine solution are added to the stabilizer solution until further addition of the polyamine solution produces no further precipitation.

The rubber dispersion may be flocculated by means of the stabilizer, polyamine and acidic material in a variety of ways; for example, the stabilizer may be added to the dispersion and dilute acid carefully added so as to avoid local coagulation until the pH of the dispersion has been reduced to below the critical pH at which the reaction product of the stabilizer and amine will be insoluble and below the pH at which the dispersion is unstable in the presence of the amine and in the absence of the stabilizer. The polyamine may then be added to the thus acidified dispersion to flocculate the same. Another method is to add the stabilizer and polyamine to an aqueous dispersion of a rubber and then reduce the pH sufficiently by the addition of acidic material to cause flocculation of the dispersion. An excellent method is to precipitate the reaction product of the polyamine and stabilizer in an acid medium, wash the precipitate, and dissolve it by raising the pH above the critical value below which the reaction product is insoluble. Such a solution of the redissolved reaction product of the stabilizer and amine may then be added to the rubber dispersion and the rubber flocculated merely by reducing the pH of the dispersion by the addition of acidic material. For example, equivalent amounts of the stabilizer and polyamine may be dissolved in water and acid then added to reduce the pH to the necessary value to precipitate the reaction product. The precipitate may then be filtered off and washed, and then redissolved in water containing a base such as ammonia, dimethylamine or sodium hydroxide. This alkaline aqueous solution of the reaction product of the stabilizer and polyamine may be added to an aqueous dispersion of a rubber and the dispersion then flocculated by reducing the pH.

If the rubber flocs are to be shipped, or washed, or redispersed, they should not be completely dried after separation from the serum portion but should be kept wet, preferably with 20 to 40% water content, since complete drying of the flocs prevents redispersion in alkali and produces too coherent a mass for further washing. If natural latex is flocculated at the rubber plantations, the wet flocs separated from the major proportion of the serum may be shipped as such and redispersed at the place where the rubber is to be utilized. Since the alkali may be added to the wet flocs in concentrated condition, a highly concentrated dispersion may be produced in this manner.

The following examples are illustrative of the invention.

*Example 1*

In this case the reaction product of the stabilizer and polyamine was separately prepared as follows: 100 parts of the commerical wetting agent "Aquarex D," which is said to be the mono sodium sulphate ester of a mixture of lauryl and myristyl alcohols, was dissolved in 3000 parts of water to which were then added 17 parts of a mixture of polyalkylene polyamines prepared as follows:

35 parts by weight of ethylene dichloride were reacted in an autoclave with 51 parts by weight of 26° Bé. aqua ammonia at a temperature of between 160° C. and 190° C. for two hours. After the reaction was complete and the liquid had cooled at room temperature for 2 hours, 35 parts by weight of 75% caustic solution were added and the mixture was heated to decompose the amine hydrochlorides and the ammonium chloride remaining in solution, and to drive out the ammonia. The reaction mixture separated into an oily upper layer comprising an aqueous solution of a mixture of polyamines, some of which had three and four amino groups, and a lower layer containing a water solution of caustic and suspended sodium chloride. The oily layer, referred to hereafter as "polyalkylene polyamine mixture," was separated from the lower layer.

To the water solution of the "Aquarex D" and the "polyalkylene polyamide mixture" there was then added sufficient acid (91 parts of 2.5 normal hydrochloric acid) to reduce the pH of the mixture to about 4.5, whereupon a flocculant precipitate was formed which was freed from the remainder of the solution by filtration. The precipitate was redissolved with the minimum amount of 28% aqueous ammonia and diluted with water to give a solution containing 10% by weight of the reaction product.

20 parts of this 10% solution of the reaction product of the stabilizer and polyamine were added to 254 parts (wet weight) of 39.4% solids ammonia-preserved natural rubber latex of which the ammonia content of .65% had been reduced to .26% by aeration. 215 parts of water were then added to the mixture to reduce the rubber concentration and to dilute the water soluble non-rubber constituents of the mixture, follower by 7.9 parts of 2.5 normal hydrochloric acid. During the addition of the acid, the mixture was stirred rapidly and as the acid was added, the latex agglomerated to a flocculent mass. The solids concentration of the dispersion at the time of flocculation calculates about 21% from the above figures. 323 parts of water were then added to further wash the rubber, and after being stirred to break up the flocs, the mixture was filtered through filter paper, giving a wet filter cake having a total solids content of 56%. The filtrate was yellow in color and had a pH of 4.56. The wet filter cake could be shipped and kept in storage for any desired period of time and was readily redispersed to a stable latex on the addition of a small amount of 28% aqua ammonia. On addition of the ammonia, the filter cake appeared to gradually melt and with a slight amount of stirring a stable uncoagulated latex resulted.

It is not necessary to prepare the reaction product of the stabilizer and the polymaine outside the latex. Similar results to the above were obtained when the "polyalkylene polyamine mixture" was added to the latex followed by the "Aquarex D," then all the water, and finally the hydrochloric acid, and also where the "Aquarex D" was added to the latex followed by all the water and hydrochloric acid and finally the "polyalkylene polyamine mixture."

Example 2

This example illustrates the use of various stabilizers other than the "Aquarex D" used in Example 1. In this case amounts of various stabilizers as shown in the table below, were added to various portions of a 40% solid content natural rubber latex preserved with 1.5% of ammonia. To the different samples of latex containing the various stabilizers were added amounts of a 5% aqueous solution of the "polyalkylene polyamine mixture" prepared according to Example 1, together with a large amount of water as set forth below. Following the addition of the polyamine mixture, amounts of acetic acid and water (as shown below) were added with rapid stirring, whereupon the compounds flocculated readily and were filtered with ease. The solids concentration at flocculation calculates about 15% to 16% for the various samples. The filter cake in each case was redispersible by the addition of small amounts of ammonia or sodium hydroxide solution. The pH's of the filtrates in each case and amounts of added materials are set forth in the following table:

|  | Parts by weight (wet) | | | | |
|---|---|---|---|---|---|
| 40% solids concentration latex (1.5% ammonia) | 250 | 250 | 250 | 250 | 250 |
| 10% Nekal A | 100 | | | | |
| 10% Nacconal LA | | 50 | | | |
| 10% Igepon T | | | 100 | | |
| 10% Santomerse D | | | | 50 | |
| 10% sodium lauryl sulfonate | | | | | 50 |
| 5% "polyalkylene polyamine mixture" | 22⎫ | 20⎫ | 40⎫ | 20⎫ | 20⎫ |
| Water | 340⎭ | 340⎭ | 340⎭ | 340⎭ | 340⎭ |
| 2.5 N acetic acid | 40⎫ | 40⎫ | 47⎫ | 38⎫ | 38⎫ |
| Water | 20⎭ | 86⎭ | 20⎭ | 86⎭ | 86⎭ |
| pH of filtrate | 6.5 | 5.8 | 5.9 | 6.0 | 6.2 |

The constitution of the above stabilizing agents so far as they are known, have been given previously under the illustrations of stabilizers having the general formula R—SO₃—M, as above described, with the exception of Santomerse D which is a stabilizer of the general formula R—SO₃—M, the exact composition of which is unknown except that R is said to be an alkylated aromatic nucleus and M is presumably sodium.

Example 3

This example illustrates the use of various polyamines other than the "polyalkylene polyamine mixture" used in Examples 1 and 2. In this case amounts of "Aquarex D," as shown in the table below, were added to various portions of a 39.4% solid content natural rubber latex of which the .65% ammonia used to preserve the latex had been reduced by aeration to .26%. To the various samples of latex containing the "Aquarex D" were added large amounts of water and acetic acid and then more water, in the order set forth below. To the thus prepared acid latex amounts of various polyamines (as shown below) were added with rapid stirring, whereby the latex flocculated smoothly, filtered readily, and could be redispersed on the addition of small amounts of ammonia or other base. The concentration of the dispersion at flocculation calculates about 13% solids content. The pH's of the filtrates and the amounts of added materials are shown in the following table:

|  | Parts by weight (wet) | | |
|---|---|---|---|
| 39.4% solids concentration latex (.26% ammonia) | 254 | 254 | 254 |
| 10% "Aquarex D" | 40 | 40 | 40 |
| Water | 340 | 340 | 340 |
| Water | 96⎫ | 96⎫ | 96⎫ |
| 2.5 N acetic acid | 48⎭ | 42⎭ | 50⎭ |
| 5% diethylene triamine | 30 | | |
| 5% triethylene tetramine | | 16 | |
| 5% "Trimene" base | | | 12 |
| pH of filtrate | 5.5 | 6.4 | 6.0 |

Example 4

This example illustrates the employment of the principles of the present invention in concentrating and in purifying aqueous dispersions of synthetic rubbers, such as "Neoprene latex #56" (an aqueous dispersion of polymerized chloro-2-butadiene 1,3) and "Perbunan latex" (an aqueous dispersion of a co-polymer of butadiene and acrylic nitrile). The commercial neoprene and Perbunan latices as received had solids content of 49% and 35% by weight respectively. To 400 parts of each of the "neoprene latex" and "Perbunan latex," diluted with water to 25% solids content were added 50 parts of 10% "Aquarex D" followed by 20 parts of the 5% "polyalkylene polyamine mixture" used in Example 2. To the thus treated rubber dispersions were then added with rapid stirring 50 parts of 2.5 normal acetic acid. In each case the synthetic rubber dispersion flocculated readily and gave a stable crumb which was readily filtered. The solids content at flocculation calculates about 21% and 22% for the neoprene and Perbunan latices, respectively. Portions of each of the moist filter cakes were redispersed on the addition of a small amount of ammonia to give dispersions of neoprene and "Perbunan" of 62% and 55% by weight of solids concentration, respectively. Other portions of each filter cake were washed with water, pressed to remove additional water, and dried to form crude purified synthetic rubbers.

Example 5

This example illustrates the utilization of the present invention as a means of purifying natural rubber latex by removal of putrescible proteins and other water soluble materials therefrom. To normal ammonia-preserved 39.4% solids content latex were added 1.33 parts by weight of sodium hydroxide per 100 parts of latex solids, and the major portion of the ammonia was removed by aeration. By analysis this latex was found to contain .53% of protein nitrogen per 100 parts of latex solids. To 224 parts of the latex there were added 25 parts by weight of a 10% solution of the reaction product of "Aquarex D" and the "polyalkylene polyamine mixture" used in Example 1. To the thus treated latex were then added 143 parts by weight of water together with 10 parts by weight of a 2.5 normal aqueous hydrochloric acid solution, whereupon the latex flocculated. The solids content at flocculation calculates about 25%. To the flocculated latex were then added 340 parts by weight of water, and the mixture was stirred thoroughly for several minutes, after which the mixture was filtered through filter paper to separate the flocs from a major proportion of the serum. The pH of the filtrate was measured using the glass electrode and was found to be 7.36. Flocculation of the rubber particles at this high pH permits the removal by washing of a large amount of proteins that are usually insolubilized and become attached to the rubber when the rubber is coagulated at a lower pH as in conventional crude rubber manufacture. The percent solids in the filtrate was 1.79%, and the percent solids in the filter cake was 71%. The percent protein nitrogen on the rubber solids in the filter cake was .10%. The percent protein nitrogen on the rubber solids was obtained from the total nitrogen percent by correcting for the amount of nitrogen contributed by the reaction product of the "Aquarex D" and the "polyalkylene polyamine mixture" associated with the filter cake. 81.3% of the protein nitrogen was removed by flocculating and washing at a pH of 7.36. When the same latex was flocculated at a pH of 6.98 by the addition of 13.3 parts of a 2.5 normal hydrochloric acid solution instead of 10 parts and the flocs washed the same amount, the amount of protein nitrogen removed was 79.2% of that occurring in the original latex. Flocculating the same latex at pH's of 5.24 and 4.71, respectively, and washing an amount equivalent to the above, showed removal of 60.3% and 45.3% of the original protein nitrogen respectively. The flocculation should be carried out at a pH above 5, if it is desired to remove a majority of the protein nitrogen. The filter cakes could be readily passed through rollers and dried to form purified crude rubber. By adding a few drops of ammonia or sodium hydroxide to the filter cakes, stable uncoagulated latices were obtained. The redispersed latex prepared from that flocculated at a pH of 7.36 was compounded with the usual rubber curatives and accelerators for an insulation compound and spread sheets were prepared therefrom, and spread sheets were also prepared from a compounded thrice-creamed latex containing .10% nitrogen. Both samples of spread sheet were vulcanized and their water absorption properties measured. After soaking ten days, both sheets had absorbed essentially the same amount of water.

*Example 6*

This example illustrates the utilization of the present invention as a means of purifying concentrated natural rubber latex. A 10% solution of the reaction product of the commercial stabilizer "Santomerse D" and the "polyalkylene polyamine mixture" of Example 1 was prepared in the same manner as was the reaction product of "Aquarex D" and the "polyalkylene polyamine mixture" in Example 1. Twenty-five parts by weight of this 10% solution of the reaction product of "Santomerse D" and the "polyalkylene polyamine mixture" were added to 158 parts by weight of a once-creamed ammonia preserved latex, containing 63.5% total solids and .67% ammonia. To the thus treated creamed latex were added 200 parts by weight of water followed by 19 parts by weight of a 2.5 normal aqueous hydrochloric acid solution, whereupon the cream flocculated to a thick suspension of readily filterable rubber flocs. The concentration of the dispersion at flocculation calculates about 25% solids content. 340 grams of water were added to the flocculated latex cream with slow stirring and the flocs were separated from the serum by filtration. After filtration, the filter cake was dewatered by pressure and then dried to give a purified crude rubber having a low protein nitrogen content. The pH of the filtrate was measured by the glass electrode and found to have a value of 7.46. By analysis it was found that the protein nitrogen content of the crude rubber thus produced was .034%, which when compared with the protein nitrogen content of the original solids in the creamed latex of .27%, shows a removal of 87.4% of the protein nitrogen from the rubber. Other samples of the same creamed latex were flocculated at lower pH's, namely at pH's of 6.46, 4.98 and 4.51 by the addition of larger amounts of hydrochloric acid and washed the same amount as above by equivalent dilution after acidification. In these cases, the removal of protein nitrogen amounted to 63.0%, 33.4% and 22.2% respectively, of the protein nitrogen originally present in the cream solids. It may be seen that concentrated latex as well as normal latex should be flocculated at a pH above 5, if high removal of proteins is desired.

*Example 7*

This example illustrates the application of the invention to the recovery of a high grade rubber from skimmed latex. In present day commercial centrifuging of natural rubber latex, the cream or concentrate has a solids content of around 60% and a low non-rubber content, and the skim contains from 10 to 20% of total solids which consists of 70 to 75% rubber and 25 to 30% non-rubber impurities. Because of its abnormally high ratio of proteins and other natural protectives, relative to the rubber, the skim is difficult to acid coagulate, and the rubber obtained therefrom by acid coagulation contains an undesirably high percentage of non-rubber constituents. The dried down solids of the skim contain an even higher percentage of non-rubber solids. Hence, crude rubber prepared from centrifuge skim is extremely low grade. It possesses an objectionable odor which usually gets worse as time passes. The rubber is stiff and difficult to mill and it will not cure or age well. The color is bad, being a dark brown. Heretofore, such rubber has sold at a very low price or the centrifuged skim itself has been either thrown out or used as a fertilizer on the Plantations. In any event, the rubber content of centrifuged skim has represented a very considerable economic loss. By the present invention a satisfactory crude rubber may readily be recovered from centrifuged skim or from the serum portion resultant from the chemical or other creaming of latex. Also, the invention is of value where it is desired to recover a high grade or purified rubber from the heavier portion of a centrifuging or creaming operation where a large amount of rubber, and even a major proportion of the rubber in the latex, is separated in the heavier portion or skim.

To 5462 parts by weight of the skim from centrifuging ammonia latex, which skim contained 1000 parts by weight of solids (18.3% solids) and 9.6 parts by weight of ammonia (.18%), the ammonia in the skim having been reduced to this value by aeration, was added 200 parts by weight of a 10% aqueous solution of "Aquarex D" followed by 200 parts by weight of 2.66 normal aqueous acetic acid and this followed by 160 parts by weight of the 5% "polyalkylene polyamine mixture" used in Example 2, the mixture being stirred thoroughly during the addition of each batch of reagent. After the addition of the polyamine mixture the dispersion flocculated to a suspension of readily filterable rubber agglomerates. The solids content of the dispersion at flocculation calculates about 17%. The mixture was diluted with 13,960 parts by weight of water and allowed to stand. After several hours, the flocs creamed to the surface and gradually coalesced to form a sort of cheesy coagulum of rubber floating on a dark brown serum. The serum was found to have a pH of 6.20. The coagulum had sufficient mechanical strength so that it could be removed from the subnatant serum without falling apart, and was passed through creping rollers to remove the majority of the remaining serum before being dried.

The following table gives a comparison between the physical properties of a sample of the dried down whole solids skim, of the purified rubber prepared from the skim as above in this example, and a sample of smoked sheet:

|  | Whole solids skim | Purified rubber of this example | Smoked sheet |
| --- | --- | --- | --- |
| Color | Deep brown | Pale straw | Brown. |
| Odor | Very bad | None | Smoky. |
| Acetone extract | 11% | 4% | 3%. |
| Ash | 2.3% | .1% | .4%. |
| Protein nitrogen | 1.4% | .3% | .5%. |

The protein nitrogen was reduced 77% by the purification and flocculation at a pH of 6.20. An equivalent purification with flocculation at a pH of 4.81 gave a protein nitrogen content of the dried product of .8% or a 43% removal of protein nitrogen. With skim as with normal and concentrated latex, it is desirable to flocculate at a pH above 5 if high removal of protein nitrogen is desired.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of treating an aqueous dispersion of a rubber which comprises mixing with an aqueous dispersion of a rubber a stabilizer having the general formula R—$SO_3$—M, wherein R represents an organic radical containing at least one group having more than 8 carbon atoms and R is selected from the the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine having two to four alkylene and three to five amino groups, at a pH at which the reaction product of said stabilizer and said amine is insoluble and the dispersion is unstable in the absence of the stabilizer and in the presence of the amine, whereby to flocculate the dispersion, the dispersion at the time of flocculation having a solids content of at least 13%.

2. The method of treating an aqueous dispersion of a rubber which comprises mixing with an aqueous dispersion of a rubber a stabilizer having the general formula R—$SO_3$—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine selected from the group consisting of diethylene triamine, triethylene tetramine, and tetraethylene pentamine, at a pH at which the reaction product of said stabilizer and said amine is insoluble and the dispersion is unstable in the absence of the stabilizer and in the presence of the amine, whereby to flocculate the dispersion, the dispersion at the time of flocculation having a solids content of at least 13%, and separating the flocs from the serum.

3. The method of treating an aqueous dispersion of a rubber which comprises mixing with an aqueous dispersion of a rubber a stabilizer having the general formula R—$SO_3$—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine having two to four alkylene and three to five amino groups, at a pH at which the reaction product of said stabilizer and said amine is insoluble and the dispersion is unstable in the absence of the stabilizer and in the presence of the amine, whereby to flocculate the dispersion, the dispersion at the time of flocculation having a solids content of at least 13%, washing the rubber with water, and separating the flocs from the serum.

4. The method of treating an aqueous dispersion of a rubber which comprises mixing with an aqueous dispersion of a rubber a stabilizer having the general formula R—$SO_3$—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group, consisting of alkali metal, hydrogen and ammonium, and an alkylene polyamine having two to four alkylene and three to five amino groups, at a pH at which the reaction product of said stabilizer and said amine is insoluble and the dispersion is unstable in the absence of the stabilizer and in the presence of the amine, whereby to flocculate the dispersion, the dispersion at the time of flocculation having a solids content of at least 13%, separating the flocs from the serum as a wet mass, and redispersing the flocs.

5. The method of treating an aqueous dispersion of a rubber which comprises mixing with an aqueous dispersion of a rubber a stabilizer having the general formula R—SO$_3$—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine selected from the group consisting of diethylene triamine, triethylene tetramine, and tetraethylene pentamine, at a pH at which the reaction product of said stabilizer and said amine is insoluble and the dispersion is unstable in the absence of the stabilizer and in the presence of the amine, whereby to flocculate the dispersion, the dispersion at the time of flocculation having a solids content of at least 13%, washing the rubber with water, separating the flocs from the serum as a wet mass, and redispersing the washed flocs by the addition of alkali thereto.

6. The method of treating an aqueous dispersion of a rubber which comprises mixing with an aqueous dispersion of a rubber a stabilizer having the general formula R—SO$_3$—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine having two to four alkylene and three to five amino groups, at a pH at which the reaction product of said stabilizer and said amine is insoluble and the dispersion is unstable in the absence of the stabilizer and in the presence of the amine, whereby to flocculate the dispersion, the dispersion at the time of flocculation having a solids content of at least 13%, washing the rubber with water, filtering the flocs, and raising the pH of the wet filter cake to above 9.5 to redisperse the flocs.

7. The method of treating an aqueous dispersion of a rubber which comprises mixing with an aqueous dispersion of a rubber a stabilizer having the general formula R—SO$_3$—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine selected from the group consisting of diethylene triamine, triethylene tetramine, and tetraethylene pentamine, at a pH at which the reaction product of said stabilizer and said amine is insoluble and the dispersion is unstable in the absence of the stabilizer and in the presence of the amine, whereby to flocculate the dispersion the dispersion at the time of flocculation having a solids content between 13% and 30%.

8. The method of treating an aqueous dispersion of a rubber which comprises mixing with an aqueous dispersion of a rubber a stabilizer having the general formula R—SO$_3$—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine having two to four alkylene and three to five amino groups, at a pH at which the reaction product of said stabilizer and said amine is insoluble and the dispersion is unstable in the absence of the stabilizer and in the presence of the amine, whereby to flocculate the dispersion, and separating the flocs from the serum, the dispersion at the time of flocculation having a solids content between 13% and 30%.

9. The method of treating an aqueous dispersion of a rubber which comprises mixing with an aqueous dispersion of a rubber a stabilizer having the general formula R—SO$_3$—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine selected from the group consisting of diethylene triamine, triethylene tetramine, and tetraethylene pentamine, at a pH at which the reaction product of said stabilizer and said amine is insoluble and the dispersion is unstable in the absence of the stabilizer and in the presence of the amine, whereby to flocculate the dispersion, separating the flocs from the serum as a wet mass, and redispersing the wet flocs by the addition of alkali thereto the dispersion at the time of flocculation having a solids content between 13% and 30%.

10. The method of recovering a purified rubber from a natural aqueous dispersion of rubber such as normal, concentrated or skimmed latex, which comprises mixing with such dispersion a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine having two to four alkylene and three to five amino groups, at a pH above 5 and at which the reaction product of said stabilizer and said amine is insoluble and at which the dispersion is unstable in the absence of the stabilizer and in the presence of the amine, whereby to flocculate the dispersion, the dispersion at the time of flocculation having a solids content of at least 13%, washing the rubber, separating the flocs from the serum, and drying.

11. The method of recovering a purified synthetic rubber from an aqueous dispersion of a synthetic rubber, which comprises mixing with such dispersion a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine having two to four alkylene and three to five amino groups, at a pH above 5 and at which the reaction product of said stabilizer and said amine is insoluble and at which the dispersion is unstable in the absence of the stabilizer and in the presence of the amine, whereby to flocculate the dispersion, the dispersion at the time of flocculation having a solids content of at least 13%, washing the rubber, separating the flocs from the serum, and drying.

12. The method of concentrating an aqueous dispersion of a rubber which comprises mixing with an aqueous dispersion of a rubber a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine selected from the group consisting of diethylene triamine, triethylene tetramine, and tetraethylene pentamine, at a pH at which the reaction product of said stabilizer and said amine is insoluble and the dispersion is unstable in the absence of the stabilizer and in the presence of the amine, whereby to flocculate the dispersion, the dispersion at the time of flocculation having a solids content of at least 13%, separating the flocs from the serum as a wet mass, and redispersing the washed flocs by the addition of alkali thereto to form a dispersion of higher solids content than the original dispersion.

13. The method of concentrating an aqueous dispersion of a synthetic rubber which comprises mixing with an aqueous dispersion of a synthetic rubber a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine having two to four alkylene and three to five amino groups, at a pH at which the reaction product of said stabilizer and said amine is insoluble and the dispersion is unstable in the absence of the stabilizer and in the presence of the amine, whereby to flocculate the dispersion, the dispersion at the time of flocculation having a solids content of at least 13%, separating the flocs from the serum, as a wet mass, and redispersing the washed flocs by the addition of alkali thereto to form a dispersion of higher solids content than the original dispersion.

14. The method of purifying an aqueous dispersion of a synthetic rubber which comprises mixing with an aqueous dispersion of a synthetic rubber a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine selected from the group consisting of diethylene triamine, triethylene tetramine, and tetraethylene pentamine, at a pH at which the reaction product of said stabilizer and said amine is insoluble and the dispersion is unstable in the absence of the stabilizer and in the presence of the amine, whereby to flocculate the dispersion, the dispersion at the time of flocculation having a solids content of at least 13%, washing the rubber, separating the flocs from the serum as a wet mass, and adding alkali to the wet flocs to redisperse the same.

15. A composition comprising a wet mass of rubber flocs having a solids concentration of at least 56% containing the insoluble reaction product of a stabilizer having the general formula R—SO₃—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine having two to four alkylene and three to five amino groups.

16. A composition comprising a wet mass of rubber flocs having a solids concentration of at least 56% containing the insoluble reaction product of a stabilizer having the general formula R—SO$_3$—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine selected from the group consisting of diethylene triamine, triethylene tetramine, and tetraethylene pentamine, the rubber flocs being capable of redispersing to form a fluid dispersion on addition of alkali thereto.

17. A composition comprising a wet mass of rubber flocs having a solids concentration of at least 56% containing the insoluble reaction product of a stabilizer having the general formula R—SO$_3$—M, wherein R represents an organic radical containing at least one group having more than 8 carbon atoms and R is selected from the following: alkoxy group, alkyl group, mixed ether of long and short chain aliphatic groups, alkyl ester of a long chain fatty acid, glycol ester of a long chain fatty acid, alkyl substituted amide of a fatty acid, alkyl substituted aromatic radical, hydroaromatic radical, and ester of a dibasic acid, and M represents a radical selected from the group consisting of alkali metal, hydrogen and ammonium, and an alkylene polyamine having two to four alkylene and three to five amino groups, the composition having the characteristic that the reaction product dissolves and the rubber flocs become redispersed on the addition of alkali thereto.

STEWART R. OGILBY.